Patented May 11, 1937

2,080,034

UNITED STATES PATENT OFFICE 2,080,034

MIXED TERTIARY BUTYL ETHERS

Theodore Evans, Kensington Park, and Karl R. Edlund, Berkeley, Calif., assignors to Shell Development Company, San Francisco, Calif., a corporation of Delaware No Drawing. Original application February 9, 1935, Serial No. 5,854. Divided and this application June 20, 1936, Serial No. 86,336

3 Claims. (Cl. 260—151)

This invention relates to mixed tertiary butyl ethers of the general formula R—O—R', wherein R represents the tertiary butyl radical and —O—R' represents a branched chain alkoxy radical wherein R' is the alkyl radical of isobutyl alcohol or secondary butyl alcohol.

We are aware that certain elementary mixed ethers have been prepared by various methods but to our knowledge no one has prepared the subaltern genera and species which we claim to constitute our invention.

In our United States Patent 1,968,601, dated July 31, 1934, we have described a process for the production of mixed tertiary ethers which comprises reacting a tertiary-base olefine (an olefine capable of forming a tertiary alcohol by hydration) with an alcohol in the presence of a condensing catalyst such as sulphuric acid.

Now we have discovered that when tertiary butylene (isobutlyene) is reacted with secondary butyl alcohol or isobutyl alcohol, the aliphatic mixed tertiary butyl ethers obtained are valuable compounds which may be used alone, in admixture with each other, or mixed with other substances, as diluting agents, for solutions of various lacquers and varnishes, for example, for solutions of nitrocellulose in ethyl acetate, as solvents and as extracting agents for organic substances such as carboxylic acids, alkaloids, essential oils, essences and the like. The mixed tertiary butyl ethers of this invention form azeotropes with water, which azeotropes contain relatively large amounts of water. This water-carrying property of the ethers makes them particularly suitable water-removing agents in the dehydration of aqueous mixture of organic compounds as alcohols, aldehydes, ketones, aliphatic carboxylic acids and the like.

The novel aliphatic mixed tertiary butyl ethers may be prepared in the manner set out in the following illustrative examples.

EXAMPLE I

*Tertiary butyl isobutyl ether*

About 320 gm. of isobutyl alcohol were reacted with about 200 gm. of isobutylene in the presence of about 36 gm. of sulphuric acid at a temperature of 75° C. for about 1 hour. The mixture was then cooled, poured into dilute caustic and distilled, an azeotrope containing the tertiary butyl isobutyl ether being collected at 82.5° C. to 83.0° C. This distillate was extracted with an equal volume of dilute sulphuric acid (2 volumes of $H_2O$ to 1 volume of $H_2SO_4$), and the upper layer dried with $K_2CO_3$ and distilled. The pure ether was collected at 113.8° C., some binary isobutyl alcohol-mixed ether azeotrope first coming over at 102° C. A yield of at least 100 gm. of the pure ether was obtained.

EXAMPLE II

*Tertiary butyl secondary butyl ether*

About 250 gm. of secondary butyl alcohol, 270 gm. of isobutylene and 18 gm. of sulphuric acid were reacted at a temperature of about 75° C. for 1.5 hours. The mixture was then poured into dilute caustic and distilled. The ternary azeotrope (mixed ether-secondary butyl alcohol-water) boiling at 82° C. to 83° C. was collected and treated as in the preparation of tertiary butyl isobutyl ether. The mixed ether obtained boils at a temperature of 114° C. to 115° C. A yield of at least 75 gm. of the pure ether was obtained.

The foregoing description has been made rather detailed for clearness of understanding only, and no unnecessary limitations should be understood therefrom, but the appended claims should be construed as broadly as possible in view of the prior art.

This application is a division of our application Serial No. 5,854, filed February 9, 1935.

We claim as our invention:

1. The mixed tertiary ether of the formula R—O—R', wherein R represents the tertiary butyl radical and —O—R' represents a branched chain alkoxy radical wherein R' is the alkyl radical of a butyl alcohol of the class consisting of secondary butyl alcohol and isobutyl alcohol.

2. The mixed ether: tertiary butyl isobutyl ether.

3. The mixed ether: tertiary butyl secondary butyl ether.

THEODORE EVANS.
KARL R. EDLUND.